(12) United States Patent
Kulkarni et al.

(10) Patent No.: US 7,479,517 B2
(45) Date of Patent: Jan. 20, 2009

(54) PROCESS FOR THE PREPARATION OF FAST REHEAT (FRH) BOTTLE GRADE POLYETHYLENETEREPHTHALATE (PET) RESIN

(75) Inventors: Sanjay T. Kulkarni, Chennai (IN); Mavila P. K. Unni, Chennai (IN)

(73) Assignee: Futura Polyesters Ltd., Mumbai (IN)

( * ) Notice: Subject to any disclaimer, the term of this patent is extended or adjusted under 35 U.S.C. 154(b) by 578 days.

(21) Appl. No.: 10/990,963

(22) Filed: Nov. 18, 2004

(65) Prior Publication Data

US 2005/0176870 A1  Aug. 11, 2005

(30) Foreign Application Priority Data

Nov. 28, 2003  (IN) .......................... 972/CHE/2003

(51) Int. Cl.
*C08K 3/04* (2006.01)
(52) U.S. Cl. ...................... 524/495; 524/430; 524/496; 524/409
(58) Field of Classification Search ................. 524/495, 524/430, 496; 523/333; 428/35.7
See application file for complete search history.

(56) References Cited

U.S. PATENT DOCUMENTS

| | | | |
|---|---|---|---|
| 2,641,592 A | 6/1953 | Hofrichter et al. | |
| 3,007,891 A | 11/1961 | Gerstenberg et al. | |
| 3,028,366 A | 4/1962 | Engle, Jr. et al. | |
| 3,732,182 A | 5/1973 | Chimura et al. | |
| 3,795,639 A | 3/1974 | Chimura et al. | |
| 3,842,043 A | 10/1974 | Chimura et al. | |
| 3,905,937 A | 9/1975 | Khanna | |
| 3,907,754 A | 9/1975 | Tershansy et al. | |
| 3,962,189 A | 6/1976 | Russin et al. | |
| 3,965,071 A | 6/1976 | McClelland | |
| 4,001,171 A | 1/1977 | Khanna | |
| 4,010,145 A | 3/1977 | Russin et al. | |
| 4,082,724 A | 4/1978 | Hewertson | |
| 4,116,924 A | 9/1978 | Peabody | |
| 4,208,318 A | 6/1980 | Ono et al. | |
| 4,379,871 A | 4/1983 | Werle et al. | |
| 4,408,004 A | 10/1983 | Pengilly | |
| 4,420,581 A * | 12/1983 | McFarlane et al. | .......... 524/431 |
| 4,879,335 A | 11/1989 | Hirota et al. | |
| 5,106,905 A | 4/1992 | Oku et al. | |
| 5,419,936 A * | 5/1995 | Tindale | ..................... 428/35.8 |
| 5,484,837 A | 1/1996 | Kung et al. | |
| 5,529,744 A | 6/1996 | Tindale | |
| 6,022,920 A | 2/2000 | Maxwell et al. | |
| 6,197,851 B1 | 3/2001 | Maxwell et al. | |
| 6,503,586 B1 | 1/2003 | Wu et al. | |
| 2003/0018115 A1 | 1/2003 | Massey et al. | |
| 2005/0154118 A1* | 7/2005 | Hayes et al. | ................. 524/495 |

FOREIGN PATENT DOCUMENTS

| | | |
|---|---|---|
| EP | 0 263 412 A2 | 4/1988 |
| JP | 49-87792 A2 | 8/1974 |
| JP | 51-44220 A | 4/1976 |

* cited by examiner

*Primary Examiner*—Katarzyna Wyrozebski
(74) *Attorney, Agent, or Firm*—Morrison & Foerster LLP

(57) ABSTRACT

The present invention provides a process for the preparation of Fast Reheat (FRH) bottle grade polyethylene terephthalate (PET) resin by dispersing micron-sized carbon black in monoethylene glycol in the presence of dispersing agents and adding nano-sized particles of ferric oxide and metallic antimony to obtain a mixed carbon slurry followed by the preparation of a polymer slurry of pure terephtalic acid, mono ethylene glycol, isopthalic acid in the presence of a polymerisation catalyst and color toners, said carbon slurry and polymer slurry are added to obtain an addition mixture, which is followed by esterification and polymerisation in the presence of heat stabilizing additives to obtain Fast Reheat (PET) Resin.

Figure 1:
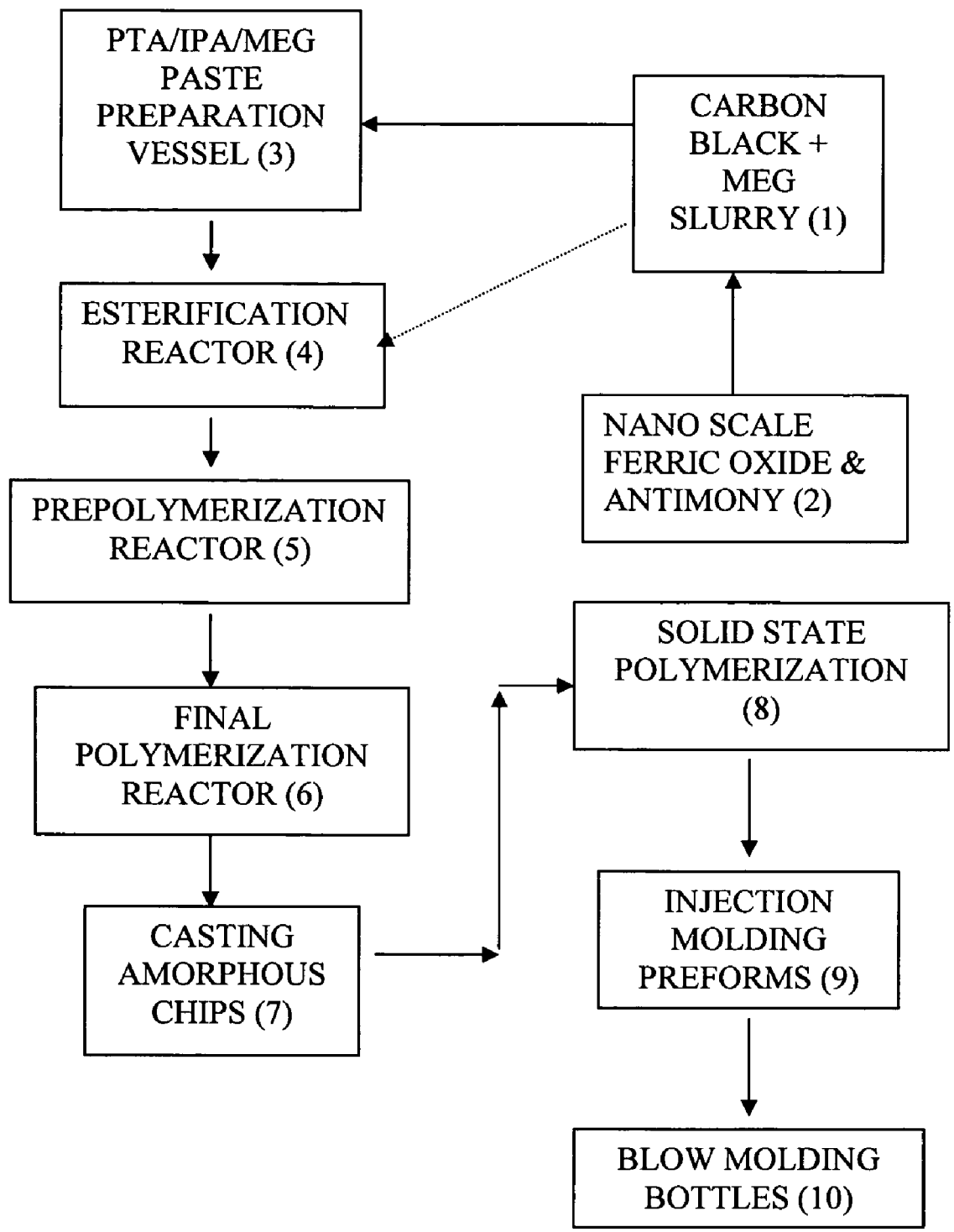

27 Claims, 1 Drawing Sheet

PROCESS FOR THE PREPARATION OF FAST REHEAT (FRH) BOTTLE GRADE POLYETHYLENETEREPHTHALATE (PET) RESIN

REFERENCE TO RELATED APPLICATIONS

This application claims priority under 35 USC §119 to Indian Patent Application No. 972/CHE/2003 filed on Nov. 28, 2003, the entire contents of which are herein incorporated by reference.

TECHNICAL FIELD

The present invention relates to a process for producing Bottle Grade Fast Reheat (FRH) Polyethyleneterephthalate (PET) resin by the esterification of Pure Terepthalic Acid (PTA), Pure Isopthalic Acid (IPA) and Monoethylene Glycol (MEG) in the presence of a mixture of finely dispersed Carbon Black, nano sized metallic Antimony and Ferric Oxide and the resultant polymer melt is stabilized in the presence of phosphorous based heat stabilizers and with the addition of toners for controlling the colour.

BACKGROUND AND PRIOR ART

During the process of Stretch Blow Molding (SBM) of PET preforms to bottles (in a two-stage process) the reduction in consumption of energy in heating the preforms prior to blowing plays a very important role in the productivity of PET bottles. With the fast cycle blow molding machines, it is critical to have short residence times and shorter equilibration times for the heat-up of Preforms before the actual blowing. The temperature differential between the outer and inner walls of the perform needs to be minimum for ensuring proper blown bottle characteristics.

U.S. Pat. Nos. 2,641,592, 3,028,366, 3,732,182, 3,795,639 3,842,043, 3,907,754, 3,962,189, 3,965,071, 4,010,145 and 4,082,724 all deal with processes for preparing linear polyesters utilizing variety of catalysts comprising Germanium, Antimony, Titanium, Manganese, Cobalt etc. and variety of phosphorous containing compounds as heat stabilizers. However, none of these patents deal with either special additives or the role of catalysts in the heat absorption characteristics of the polymer.

U.S. Pat. Nos. 5,484,837, 5,106,905, 4,879,335, 4,379, 871, 4,208,318, 4,116,924, 4,001,171, 3,905,937 & 3,007, 891 and JP 49-87792 deal with carbon black addition to PET to produce a black master batch concentrate for colouring polyesters and not related to their reheat characteristics.

U.S. Statutory Invention Registration H2018 H discloses a process wherein fast heat up additives controls the blow temperatures of multilayered preform or container of PET/PEN. Additives like carbon black, graphite, diamond dust and various colorants were tried to bring the two polymeric layers to the respective blow temperatures at almost the same time. In this published work, though the additives are functioning as heating aids, their main purpose is to bring the different layers in a multilayer preform to the same blowing temperature.

U.S. Pat. No. 4,408,004 discloses the use of carbon black (particle size 10-500 nm) in PET in a range less than 10 ppm for producing high clarity, low haze polyester with improved heat up rates. To improve the clarity, phosphates have been used as heat stabilizers along with Cobalt based compounds as bluing agents.

In U.S. Pat. No. 6,022,920 the additives used are black iron oxides $Fe_3O_4$ in the sizes between 0.1 and 10 microns.

U.S. Pat. No. 6,503,586 relates to a polyester composition containing inorganic black particles which are copper chromite spinels as I.R. absorbing materials having average particle size of 0.9 and 1.2 micron. These pigments were added at a level of 10-50 ppm to get colourless bottles whose brightness and yellowness is measured. Reheat additives at this high level is likely to cause colour and haze problem in the bottles U.S. Pat. No. 6,022,920 discloses a process for making PET with improved reheat rates by adding about 5 to 50 ppm black iron oxide particles. In this process the iron particles are added at higher levels viz., 50 ppm to get about 15% less reheat time affecting the L* value and colour of the bottle.

U.S. Pat. No. 6,197,851 presents an invention relating to PET polymer containing one of a series of organic/metallo organic I.R. heat absorbing compounds which includes phthalocyanines, substituted indanthrones and anthrquinones etc. Invariably in such processes controlling the color and haze is difficult.

U.S. Pat. Nos. 5,419,936 and 5,529,744 describe a process of using reducing agents for incorporating metal particles like Antimony in the polyester for reducing the reheat time. If the reduction is not controlled, there is a possibility of the total $Sb_2O_3$ getting reduced to Sb, which can result in more graying and haziness in the sheet and bottle apart from reducing the catalytic activity.

The combined teachings of the U.S. Pat. Nos. 6,022,920, 5,419,936 and 5,529,744 disclose methods of obtaining enhanced heating rates. U.S. Pat. No. 6,022,920 makes use of 5 to 50 ppm of black iron oxide particles as additives and U.S. Pat. Nos. 5,419,936 & 5,529,744 deal with in-situ reduction of $Sb_2O_3$ to metallic particles like antimony by using reducing agents.

U.S. patent application Publication 2003/0018115 deals with reheat aid additives like FeP, $Fe_2P$, $Fe_3P$, FeSi or the blends of these, which improve the heat-up rates without substantially affecting the colour of the product.

OBJECTS OF THE INVENTION

The main object of the present invention is to provide a process for producing Bottle Grade Fast Reheat (FRH) Polyethyleneterephthalate (PET) resin by the esterification of Pure Terepthalic Acid (PTA), Pure Isopthalic Acid (IPA) and Monoethylene Glycol (MEG) in the presence of a mixture of finely dispersed Carbon Black, nano sized metallic Antimony and Ferric Oxide.

An object of the present invention is to provide a process to make use of the extended surface area provided by nano sized particles of Ferric Oxide and metallic Antimony to increase the efficiency of heat-up rates.

Another object of the present invention is to provide a process to produce FRH Resin with carbon levels in the range of 2-7 ppm.

Yet another object of the present invention is to provide a process to stabilize the polymer melt in the presence of selective phosphorous based heat stabilizers and with the addition of toners for controlling the colour.

It is also an object of the present invention to provide a process for achieving a reduced time frame in the heating of the preforms as obtained by using the process steps of the invention, prior to blowing.

Yet another object of the present invention is to provide a process to obtain PET polymer with the increased rate of heat absorption without affecting the clarity and haze characteristics.

SUMMARY OF THE INVENTION

The present invention provides a process for the preparation of Fast Reheat (FRH) bottle grade polyethylene terephthalate (PET) resin by dispersing micron-sized carbon black in monoethylene glycol in the presence of dispersing agents and adding nano-sized particles of ferric oxide and metallic antimony to obtain a mixed carbon slurry followed by the preparation of a polymer slurry of pure terepthalic acid, mono ethylene glycol, isopthalic acid in the presence of a polymerisation catalyst and color toners, said carbon slurry and polymer slurry are added to obtain an addition mixture, which is followed by esterification and polymerisation in the presence of heat stabilizing additives to obtain Fast Reheat (PET) Resin.

BRIEF DESCRIPTION OF THE ACCOMPANYING DRAWING

FIG. 1 describes Schematic Process Flow Diagram of the present invention

DESCRIPTION OF THE INVENTION

The present invention provides a process for producing Fast Reheat (FRH) PET resin by finely dispersing Carbon Black, nano sized particles of Ferric Oxide and metallic Antimony in the presence of a selective combination of phosphorous based heat stabilizers and toners.

The embodiments of the present invention are disclosed by initially describing the process steps for the preparation of mixed carbon slurry of desired concentration and thereafter the process steps for the preparation of raw material slurry followed by addition of carbon slurry to the raw material slurry. Finally, the present invention discloses process steps relating to esterification and polymerisation to obtain a bottle grade FRH PET resin.

Preparation of Mixed Carbon Slurry

In order to prepare mixed carbon slurry, USFDA approved special Carbon Printex F alpha by Degussa with very fine particle size in the range of 0.3-5 microns, preferably 1-3 microns is used and whereas the Carbon Black content is in the range of 2-7 ppm, preferably 2.2-4.8 ppm is suspended in Monoethylene Glycol (MEG) with concentration of 1-20 wt %, preferably 3-15% and more preferably 4-10%, in the presence of dispersants Polyvinyl Pyrrolidone (PVP), which is sourced from BASF as Kollidon K 17 and polyacrylate (EFKA 4560--EFKA Additives, The Netherlands,). The polyacrylate polymer carries basic moieties of tertiary amino functions of aromatic or non-aromatic character attached to a modified polyacrylate polymer. The concentration of PVP is in the range of 0.3-2.0%, preferably 0.4-1.5% and polyacrylate in the range of 0.2-2.5%. To this suspension nano sized Ferric Oxide and metallic Antimony having a particle size in the range of 20-30 nm and in the quantities of 0.5-10 ppm, preferably in the range of 2.5-3.5 ppm are added as slurry in MEG. The dispersion of nano sized ferric oxide, nano sized metallic antimony in the slurry is unique because of their extensive surface area and their effectiveness in heat absorption. This combination is well mixed in a preparation vessel and then circulated through a special bead mill. In the present invention a special agitator bead mill catering to high energy, high flow, multiple pass operations is adopted. This recirculation bead mill passage helps to achieve very narrow submicron particle size distributions of the ingredients.

The slurry is mixed in the mill for about 4-12 hours for breaking the agglomerates of carbon black, if any, formed during the preparation process and to obtain slurry with carbon black of desired particle size. This concentration is diluted with Monoethylene glycol (MEG) to the desired end concentration between 0.5-5.0 percent to obtain mixed carbon slurry and said carbon slurry is stored in service tank under agitation.

Preparation of Raw Material Slurry

A slurry of Pure Terephthalic Acid (PTA) and Mono Ethylene Glycol (MEG) in the ratio of about 70:30 wt % is prepared in a paste preparation vessel along with the required concentration Pure Isopthalic Acid (IPA), which is around 0.5-4%, preferably 1-3.5% and more preferably 1.5-3% over the said polymer concentration. The polymerisation catalyst $Sb_2O_3$ in the concentration of 100-400 ppm, preferably 150-350 ppm and more preferably 200-300 ppm is added to the paste preparation vessel along with Cobalt Acetate in the range of 40 to 100 ppm, preferably 45-90 ppm and more preferably in the range of 50-70 ppm as a color toner along with additional red and/or blue toners in the range of 0.2 to 3 ppm, preferably 1-3 ppm and more preferably 1.1-2.5 ppm. In the present invention, Antimony trioxide ($Sb_2O_3$) acts as a polymerisation catalyst. The Carbon slurry from the service tank carrying the carbon particles and nano particles of Ferric Oxide and metallic Antimony are added in the paste to give the carbon concentration in the final polymer to the tune of around 0.5 to 4.0 ppm and nano sized particles of Ferric Oxide and metallic Antimony in the range of 0.1 to 4 ppm in the final polymer. Depending on the production schedule, at times, the additives viz. Carbon Black, Nano sized Ferric Oxide and metallic Antimony are added in the esterifier instead of in the PTA/IPA/MEG paste.

It is understood here that IPA is not used whenever the resultant product is a homopolyester as for certain applications the homopolyester resin without the added IPA is used.

Reaction Process

Initially the esterifier reactor is empty and having a temperature in the range of 240-270° C. The reactor is also maintained under an inert Nitrogen atmosphere. The reactor pressure is maintained in the range of 0.5-3.0 $Kg/cm^2(g)$. To this reactor, a supply of PTA/MEG/IPA paste is commenced. Subsequent to the supply of the required quantity of the paste, further supply of the paste is stopped.

In the esterification reactor the PTA/IPA gets converted to a pre-polymer or an oligomer—bishydroxyethyl terephthalate (BHET). Thus the complete mass gets converted to the BHET viz. prepolymer/oligomer under a degree of polymerization (DP) to the tune of 5-10.

The present invention also envisages a HEEL PROCESS for speeding up the esterification process for ensuring very low levels of byproduct formation. This is critical for ensuring that the product formed gives consistent clarity (lack of haze) and colour values in the bottles made there from. In the HEEL PROCESS, after the conversion of first batch PTA/IPA, a portion of BHET remains in the esterifier reactor to act as PREPOLYMER HEEL. This helps to hasten all the above-mentioned unit process in the subsequent batches.

After achieving the desired end temperature of 255-275° C. and the conversion of about 98.5% of the batch processing, the pre-polymer is filtered through a 20 micron filter and transferred to a pre-polyreactor under nitrogen pressure in the case of three reactor systems or directly to the autoclave in the case of two reactor systems. The pre-polyreactor is equipped with an agitator, internal heating coil and external limpet coil. The pre-polymer is processed by gradually reducing the pressure to 5-15 mbar (abs) and increasing the temperature to about 260-285° C. After an increase in Degree of Polymerisation (DP) the melt is transferred after filtration to the Polymerization reactor, which is equipped with a special agitator, condenser and a fine vacuum system. The polymerization takes place in the presence catalyst viz. Antimony Trioxide. Here the polymer melt with a low starting DP is raised to its required final high DP of 100-110 by reducing the pressure to as low as 0.1-0.5 mbar (abs) and the temperature to about 292-298° C. The polymer melt is stabilized with a combination of heat stabilizers selected from Phosphorous Acid/Orthophosphoric Acid (OPA)/Triethylphosphonoacetate (TEPA), or a combination thereof. The concentration of the heat stabilizers is in the range of 100-500 ppm, preferably 200-300 ppm and more preferably 50-250 ppm. In the present invention a combination of TEPA and OPA is used in the ratio of 1:2. The polymer melt is then extruded under nitrogen pressure and converted into pellets. This amorphous copolyester FRH RESIN is further solid state polymerized to an Intrinsic Viscosity (IV) of 0.80-0.86 to obtain FRH bottle grade resin. This solid state polymerized resin is used for injection molding preforms which are subsequently blown into bottles by stretch blow molding.

The properties of the polymer resin as obtained by using the process steps of the present invention are as shown below:

| FRH AMORPHOUS COPOLYESTER | |
|---|---|
| IV | 0.600 ± 0.04 dl/g |
| COOH end groups | 30 ± 5 meq/kg |
| DEG | 1.0 ± 0.1% |
| Melting Point | 246 ± 2° C. |
| L (CIE) | 65 ± 2 |
| b (CIE) | −5.5 ± 1.0 |

| FRH SSP RESIN COPOLYESTER | |
|---|---|
| IV | 0.800 ± 0.02 dl/g |
| COOH end groups | <30 meq/kg |
| DEG | 1.0 ± 0.1% |
| Melting Point | 246 ± 2° C. |
| L*(CIE) | Min. 74 |
| 'b'(CIE) | Max 0 |

L & b values are standard values as provided by Commission de l'eclairage of France (CIE)

The polymer obtained in the present invention is also checked for its increased reheat characteristics by a laboratory gadget by ascertaining the time taken to reach 110° C. and compared with the control resin, i.e. similar resin but without any reheat additives. It is observed that by adopting the process steps of the present invention a reduction in the range of 15-18% in reheating of the polymer is observed. The laboratory device is an in house fabricated setup where a known quantity of resin is heated by heaters to a specific temperature which is monitored by thermal sensors and the time taken is noted. This is further confirmed by measuring the time taken for the preforms to attain the temperature of 110° C. The resultant power saving in the preform heating is between 15 and 20% depending on the size of the preform and also resulted in the increase in productivity in PET bottles (~10%) in the injection stretch blow molding machine.

Therefore, by adopting a combination of additives along with nano sized Ferric Oxide and metallic Antimony improves the heat-up rates without affecting the clarity and haze in the bottles. This also gives about 10% higher productivity while blowing bottles.

SPECIFICATIONS OF RAW MATERIALS AND ADDITIVES USED IN THE PRESENT INVENTION

| Pure Terephthalic Acid (PTA) | |
|---|---|
| Acid Number (mg KOH/g) | 675 ± 2 |
| Moisture (% Wt.) | 0.5 maximum |
| Ash (% Wt.) | 0.0015 maximum |
| Iron (ppm) | 1.0 maximum |
| Color (CIE Lab- b*) | +0.5 maximum |
| Bulk Density (g/cc) | 1.10 ± 0.05 |
| Foreign Particles | Nil |
| Average Particle size (micron) | 110 ± 20 |

| Mono Ethylene Glycol | |
|---|---|
| Moisture (% Wt.) | 0.5 maximum |
| Acidity (% Wt.) (as Acetic Acid) | 0.01 maximum |
| Specific Gravity at 20° C. | 1.115 ± 0.001 |
| Chlorides (as Cl) ppm | 5 maximum |
| Iron (as Fe +++) ppm | 0.15 maximum |
| Residue (% Wt.) | 0.0015 maximum |
| Color (HU) | 10 maximum |
| Appearance | Colorless clear liquid |
| | No external contamination |
| Miscibility with water | 100% |
| DEG (% Wt.) | 0.1 maximum |
| Distillation range (° C.): | |
| 1st drop | 190 minimum |
| 5 ml | 196 maximum |
| 95 ml | 199 maximum |
| Dry point | 200 maximum |
| Ultraviolet Transmittance (%) at: | |
| 350 nm | 98 minimum |
| 275 nm | 95 minimum |
| 250 nm | 90 minimum |
| 220 nm | 70 minimum |

| Pure Isophthalic Acid (IPA) | |
|---|---|
| Acid Number (mg KOH/g) | 675 ± 2 |
| Moisture (% Wt.) | 0.5 maximum |
| Ash (% Wt.) | 0.0015 maximum |
| Iron (ppm) | 1.0 maximum |
| Color (CIE Lab- b*) | +0.5 maximum |
| Bulk Density (g/cc) | 1.10 ± 0.05 |
| Foreign Particles | Nil |
| Average Particle size (micron) | 110 ± 20 |

| Dispersing Agents | |
|---|---|
| Kollidon K 17 (PVP) | 0.3-2.0% |
| EFKA 4560 | 0.2-2.5% |

| Antimony Trioxide | |
|---|---|
| Purity (% as $Sb_2O_3$) | 99.0 minimum |
| Moisture (% Wt.) | 0.5 maximum |
| Iron (ppm) | 30 maximum |

| Cobalt Acetate | |
|---|---|
| Appearance | Violet Red or Rose, Crystals/Powder |
| Purity (%) | |
| 1. As Cobalt | 22 minimum |
| 2. As Cobalt Acetate | 92 minimum |
| Moisture content (% Wt) | 28.0 ± 2.0 |
| Solubility in hot Ethylene Glycol at 80-100° C. | Soluble |
| Presence of Foreign Particles | Nil |
| Formula | $Co(CH_3COO)_2 \cdot 4H_2O$ |

| Orthophophoric Acid (OPA) | |
|---|---|
| Assay | 88% minimum |
| Wt./ml at 20° C. | About 1.75 g |
| Chloride (Cl) | 0.001% maximum |
| Nitrate ($NO_3$) | 0.002% maximum |
| Sulphate ($SO_4$) | 0.01% maximum |
| Calcium & Magnesium | 0.01% maximum |
| Manganese | 0.06% maximum |

| Phosphorous Acid | |
|---|---|
| Assay | 97.5% minimum |
| Chloride(Cl) | 0.005% |
| Sulphate($SO_4$) | 0.03% |
| Calcium | 0.03% |
| Iron | 0.005% |
| Lead | 0.002% |

| Triethylphosphonoacetate (TEPA) | |
|---|---|
| Appearance (visual inspection) | Triethylphosphonoacetate Clear, colorless liquid |
| Phosphorous content (%) | 13.8 |

| Carbon Black | |
|---|---|
| Appearance (visual inspection) | Printex Alpha Furnace Black from Degussa or similar Food grade approved carbon blacks. |

| Blue Toner | |
|---|---|
| Appearance (visual inspection) | Labeled as POLYSYNTHRIN BLUE RBL from Clariant India Ltd. or similar Food grade approved special Blue Toner |

| Red Toner | |
|---|---|
| Appearance (visual inspection) | Labeled as POLYSYNTHRIN RED GFP from Clariant India Ltd. or similar Food grade approved special Red Toner |

Nano Ferric Oxide 20-30 nm powder from Nanostructured & Amorphous Materials, Inc. USA Nano Antimony 20 nm powder from Reade Advanced Materials, USA A comparative account of the product characteristics of the present invention in the form of 'b' values (to indicate the colour of the product) with known resins is provided in the following Table I.

TABLE I

| Sample | 'b' value |
|---|---|
| Resin (US 4408004) | 1.3-1.7 |
| Amorphous Resin of the present invention | −4.9-5.3 |
| SSP Resin of the present invention | Max 0 |
| Preforms of U.S. Publication No. 2003/0018115 | 2.08-2.28 |
| FRH Preforms* of the present invention | 3.5 to 5.4 |
| Normal Carbonated Soft Drinks(CSD) Preforms | 2.1 to 3.0 |

Normal CSD preforms are from the SSP resin without any FRH additives. Here it is given to compare with FRH preforms and to show that there is no deterioration in color due to the addition of the FRH additive.

*Comparing preform colours has limitations due to the wall thickness variations for different sizes of bottles.

A comparative statement of increase in heat-up rates or the reduction in power requirement of the resin of the present invention vis-à-vis prior art resins is as provided in Table-II.

TABLE II

| Sr. No. | Reference | Composition | % Increase in Heat-up Rates (HUR) or Power Saving(PS) |
|---|---|---|---|
| 1 | US6022920 | Black iron oxide | 15% (HUR) |
| 2 | US4408004 | Carbon Black | 7% (HUR) |
| 3 | US5419936 | Sb in situ reduction | 25% (HUR) |
| 4 | US6197851 | Organic or organo-metallic compounds | 4-17% (HUR) |
| 5 | US6503586 | Inorganic black pigments | 7-8% (PS) |
| 6 | US 2003/0018115 | Ferrous phosphides & silicates | 6-10% (HUR) |
| 7 | FRH PET Resin of the present invention | Carbon Black & Nano sized Sb and $Fe_2O_3$ | Copolyester 13-19% (HUR) Homopolyester 15% (HUR) |

The invention is further explained in the form of following Examples. However, these examples should not be construed as limiting the scope of the invention.

EXAMPLE-1

The carbon black slurry is prepared using FDA approved Printex V Carbon by Degussa with a particle size averaging 1-3 microns. It is thoroughly dispersed in Monoethylene Glycol (MEG) of 10% by using an equal mixture of Kollidon K 17 Polyvinyl Pyrrolidone (PVP) and EFKA 4560 as a dispersing agent at 0.5% level each. To this slurry 6 ppm of Nano sized Ferric Oxide and Nano sized metallic antimony with a particle size of 20 nm are added. This combination slurry is well mixed in the preparation vessel and then circulated through the bead mill for eight hours for breaking any agglomerates and to yield finely dispersed slurry wherein the final particles are not greater than 2 microns. This slurry is then further diluted to a concentration of 3% and stored in the service tank and kept under continuous agitation.

A raw material slurry of PTA/MEG in the ratio of 70:30 wt % along with 2.5% of IPA, i.e.7 kg of PTA and 3 kg of MEG along with 0.25 kg of IPA is prepared in the presence of Antimony trioxide ($Sb_2O_3$) (250 ppm) as a polymerisation catalyst along with cobalt acetate (60 ppm) red and blue color toners (1.5 ppm). The carbon slurry from the service tank is added to this such that the final polymer contains 2.5 ppm, 3.0 ppm and 3.0 ppm of the composite carbon black, ferric oxide and antimony. The mixture is transferred to the esterifier and the process of esterification, pre-polymerization and polymerization are carried out as described earlier. The polymer is stabilized with a combination heat stabilizer comprising a combination of OPA and TEPA in the ratio of 1:2 and at a concentration of 220 ppm so that the phosphorous content in the polymer is 30 ppm. The final amorphous polymer is solid state polymerized to an I.V. of 0.80.

The general reaction times of the process steps of the present invention are as follows: (a) Esterification process is about 115-145 minutes (b) Prepolymerization is about 30 minutes (if applicable) and Polymerization is about 125-155 minutes.

The results of the SSP Polymer as obtained by using the above-stated process condition are tabulated in Table III by varying the concentrations of Carbon Black

TABLE III

| Sr No. | Carbon Black Composite, ppm | I.V. dl/g | CIE L* | CIE b* | Haze Nephelometric Turbidity Unit (NTU) | Reheat Values, minutes |
|---|---|---|---|---|---|---|
| 1 | 1.0 | 0.79 | 75.6 | -2.9 | 6.0 | 14.10 |
| 2 | 2.5 | 0.81 | 75.5 | -2.2 | 6.1 | 13.11 |
| 3 | 4.0 | 0.85 | 74.1 | -2.7 | 6.6 | 12.97 |
| 4 | 6.0 | 0.83 | 73.2 | -1.9 | 6.9 | 13.07 |

It follows from the trials that shorter reheat values in combination with good L* values are obtained at carbon black composite in the concentration of 2.5 ppm.

EXAMPLE-2

Example-1 is repeated several times by keeping the carbon black composite ppm at 2.5. The results are summarized in Table-IV for the SSP resin. Good consistency in the properties of the polymer are observed.

TABLE IV

| Serial No. | I.V. dl/g | CIE L* | CIE B* | Haze NTU | Reheat Value, Minutes |
|---|---|---|---|---|---|
| 1 | 0.84 | 75.2 | -2.7 | 5.7 | 13.13 |
| 2 | 0.81 | 75.5 | -2.4 | 5.9 | 13.11 |
| 3 | 0.80 | 75.7 | -2.2 | 6.0 | 13.14 |
| 4 | 0.83 | 75.6 | -2.4 | 6.1 | 13.07 |
| 5 | 0.82 | 75.3 | -2.9 | 5.8 | 13.12 |

A comparative statement of Fast Reheat Additives used conventionally and the present invention is provided in Table V

TABLE V

| Parameter | Prior Art | Present invention |
|---|---|---|
| Additives for increased heat-up rate | Single element or compound type - metals include Sb, Sn, Cu, Ag, Au, As, Cd, Pb, Pa etc and CB. Compounds like $Fe_3O_4$, $Fe_2P$, $Fe_3P$, FeSi etc. and black pigments. | Combination type consisting of Carbon Black and nano sized Sb and $Fe_2O_3$. |

Advantages 1. present invention a combination of additives, for reheat performance improvement results in power saving and increased productivity in PET bottle manufacture.

2. Nano sized Ferric Oxide and Nano sized metallic Antimony are used as heating aids in the present invention.

3. In the present invention, combination additives proportions are such that it does not affect the clarity and haze of the bottles.

We claim:

1. A process for the preparation of fast reheat polyethylene terephthalate resin, said process comprising:
   a) dispersing micron-sized carbon black in monoethylene glycol in the presence of one or more dispersing agents and adding nano-sized particles of ferric oxide and metallic antimony to obtain a mixed carbon slurry,
   b) preparing a raw material slurry of pure terepthalic acid, mono ethylene glycol, isopthalic acid in the presence of a polymerisation catalyst and one or more color toners,
   c) adding the carbon slurry to said raw material slurry to obtain an addition mixture,
   d) esterifying the addition mixture in an esterification reactor under controlled degree of polymerisation to obtain a pre-polymer,
   e) retaining a portion of said pre-polymer as pre-polymer heel in said reactor for subsequent batch reactions,
   f) polymerising the pre-polymer with an enhanced degree of polymerization, reduced pressure and temperature to obtain a polymer melt,
   g) stabilizing said polymer melt by adding at least a heat a stabilizing additive,
   h) extruding and converting the polymer melt to form amorphous pellets under nitrogen pressure and
   i) performing solid-state polymerization to obtain fast reheat polyethylene terephthalate resin.

2. The process as claimed in claim 1, wherein the particle size of carbon black is in the range of 0.3-5 microns.

3. The process as claimed in claim 1, wherein the quantity of carbon black in the fast reheat polyethylene terephthalate resin is in the range of 2-7 ppm.

4. The process as claimed in claim 1, wherein the dispersing agents are selected from the group consisting of polyvinylpyrrolidone in the range of 0.3-2.0 wt % and polyacrylate in the range of 0.2-2.5 wt %.

5. The process as claimed in claim 1, wherein particle size of ferric oxide and metallic antimony is in the range 20-30 nanometers.

6. The process as claimed in claim 1, wherein the quantities of ferric oxide and metallic antimony in the fast reheat polyethylene terepthalate resin is in the range of 0.5-10 ppm.

7. The process as claimed in claim 1, wherein the pure terepthalic acid and mono ethylene glycol is in the ratio of 70:30.

8. The process as claimed in claim 1, wherein the quantity of pure isopthalic acid is in the range of 0.5 to 4%.

9. The process as claimed in claim 1, wherein the polymerisation catalyst is antimony trioxide in the range of 100-400 ppm.

10. The process as claimed in claim 1, wherein the colour toner comprises cobalt acetate in the range of 40-100 ppm.

11. The process as claimed in claim 1, wherein the colour toner comprises red and/or blue toners in the range of 0.2-3 ppm.

12. The process as claimed in claim 1, wherein the pre-polymer is bishydroxyethyl terephthalate.

13. The process as claimed in claim 1, wherein the controlled degree of pre-polymerisation is in the range of 5-10.

14. The process as claimed in claim 1, wherein the enhanced degree of polymerisation is in the range of 100-110.

15. The process as claimed in claim 1, wherein the reduced pressure at which the pre-polymer is polymerized is in the range 0.1-0.5 mbar absolute.

16. The process as claimed in claim 1, wherein the temperature at which the pre-polymer is polymerized initially is in the range of 260- 285° C and 292-298° C towards the end.

17. The process as claimed in claim 1, wherein the heat stabilizing additive is selected from phosphorous acid, orthophosphoric acid or triethylphosphonoacetate or a combination thereof.

18. The process as claimed in claim 17, wherein orthophosphoric acid and triethylphosphonoacetate is in the ratio of 1:2.

19. The process as claimed in claim 1, wherein the particle size of carbon black is in the range of 1 to 3 microns.

20. The process as claimed in claim 1 wherein the quantity of carbon black in the fast reheat polyethylene terepthalate resin is in the range of 2.2- 4.8 ppm.

21. The process as claimed in claim 1, wherein the dispersing agents are selected from polyvinylpyrrolidone in the range of 0.4- 1.5 wt % and polyacrylate in the range of 0.2-2.5 wt %.

22. The process as claimed in claim 1, wherein the quantities of ferric oxide and metallic antimony is in the range of 2.5- 3.5 ppm.

23. The process as claimed in claim 1, wherein the quantity of pure isopthalic acid in the fast reheat polyethylene terepthalate resin is in the range of 1.5-3%.

24. The process as claimed in claim 1, wherein the polymerisation catalyst is antimony trioxide in the range of 200-300 ppm.

25. The process as claimed in claim 1, wherein the colour toner is cobalt acetate in the range of 50-70 ppm.

26. The process as claimed in claim 1, wherein the colour toner is red and/or blue toners in the range of 1.1-2.5 ppm.

27. The process as claimed in claim 1, wherein the heat stabilizing additive is a combination of orthophosphoric acid and triethylphosphonoacetate.

* * * * *